United States Patent [19]

Mercier

[11] 4,321,949
[45] Mar. 30, 1982

[54] PRESSURE VESSEL

[75] Inventor: Jacques H. Mercier, Paris, France

[73] Assignee: The Normand Trust, New York, N.Y.

[21] Appl. No.: 127,234

[22] Filed: Mar. 4, 1980

[30] Foreign Application Priority Data

Mar. 16, 1979 [FR] France ................................. 79 6788
Apr. 27, 1979 [FR] France ................................ 79 10783

[51] Int. Cl.³ ............................................. F16L 55/04
[52] U.S. Cl. ..................................... 138/30; 220/85 B
[58] Field of Search ................... 138/26, 30; 220/85 B

[56] References Cited

U.S. PATENT DOCUMENTS

| | | | |
|---|---|---|---|
| 2,339,876 | 1/1944 | Phillips | 220/85 B |
| 2,773,511 | 12/1956 | Mercier | 138/30 |
| 3,174,658 | 3/1965 | Wittenberg et al. | 138/30 X |
| 3,983,902 | 10/1976 | Lord | 220/85 B X |
| 4,077,100 | 3/1978 | Zahid | 138/30 X |
| 4,234,016 | 11/1980 | Horino | 138/30 |

Primary Examiner—James E. Bryant, III
Attorney, Agent, or Firm—Arthur B. Colvin

[57] ABSTRACT

A pressure vessel comprises a rigid envelope enclosing a chamber and consisting of a body and cover, the rim of the cover being inserted in the rim of the body, and the body and cover being secured to each other. Defined between the overlapping rims is an annular groove adapted to receive a flange at the periphery of a circular flexible diaphragm, which serves to divide the chamber into two compartments of variable volume. There is a fluid orifice in both the body and cover, the two orifices being axially alinged and communicating one with each variable-volume compartment. To ensure a good seal between the compartments, and to enhance retention of the flange in the groove, the annular groove is of less height and greater width than the flange on the diaphragm, before the flange is sandwiched into the groove between the rims of the cover and body, so that the flange is deformed into the groove, when the cover is assembled on the body. The rims on the cover and body may be shouldered for good co-operation therebetween and the shoulder reinforced on the outside of the vessel so that it does not collapse when the vessel is pressurized.

21 Claims, 6 Drawing Figures

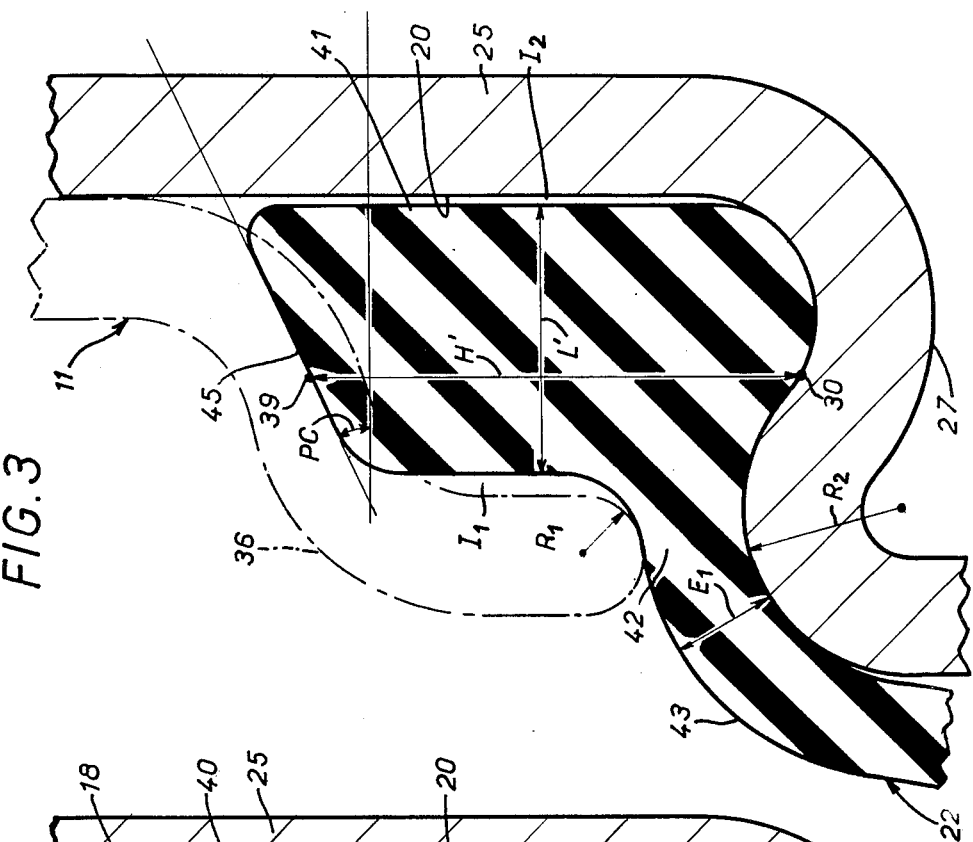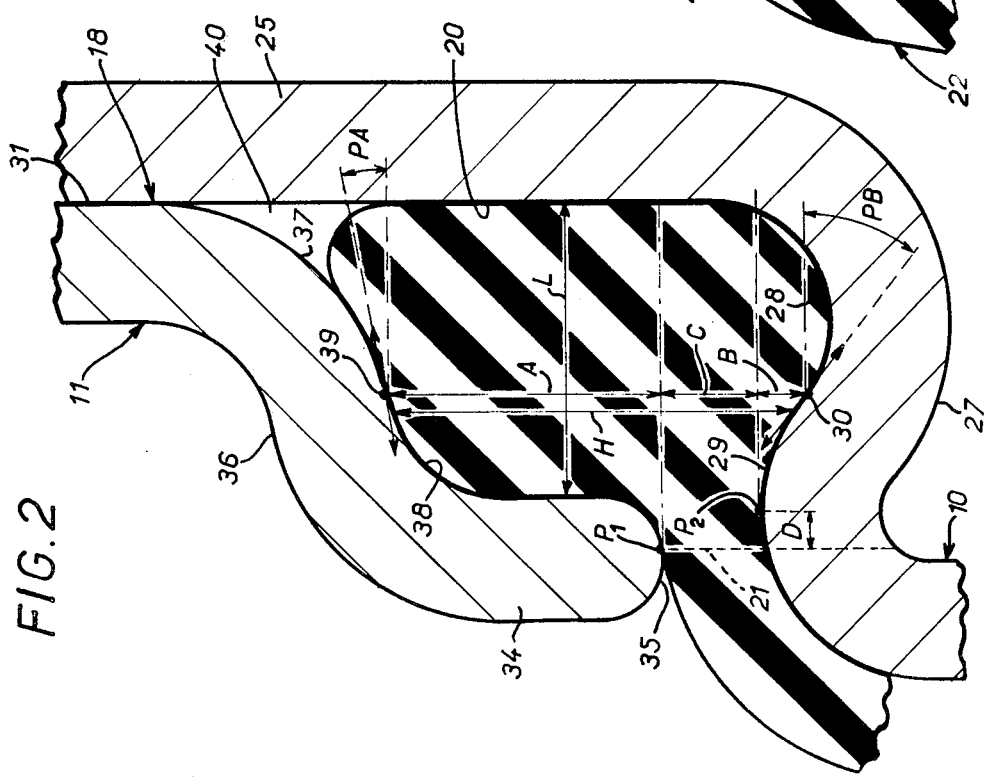

PRESSURE VESSEL

BACKGROUND OF THE INVENTION

The present invention relates to a pressure vessel which comprises a rigid envelope composed of a body and a cover, which respectively have two axially aligned fluid orifices, the cover being peripherally encased in the body and fixed to the latter, the said body and the said cover defining an annular groove which communicates with the interior of the envelope via a narrow passage, a flexible separator dividing the interior of the envelope into two fluid compartments of variable volume, which are respectively associated with the two said orifices, and the said separator passing through the said narrow passage and having a flange engaged in the groove.

During operation, the flexible separator moves and is subjected to substantial tensile stresses which tend to pull the flange out of the groove. The flange must therefore be rigidly held in this groove, and this makes it necessary to take precautions on assembly. Moreover, the flange must at the same time ensure a seal between the two compartments defined in the rigid envelope by the flexible separator.

These various conditions which must be satisfied by the flange generally result in complication of the construction in order to achieve satisfactory operation.

It has been observed that the flange must fill the groove properly, that is to say it must be mounted in the latter without play, so as to withstand the tensile stresses developed on the separator during operation, and to ensure the sealing function between the two fluid compartments.

For this purpose, it has already been proposed to make the flange oversize on all sides, relative to the groove, or also in a radial direction, that is to say parallel to the direction of the tensile stresses exerted on the separator in the region of the flange, during operation.

It has been found that these arrangements result in anchoring conditions which generally make it necessary to assemble the rigid envelope using a particular fitting, for example with the aid of an additional component, such as an annular support for anchoring the flange, and this increases the cost of construction.

The present invention relates to a pressure reservoir which does not exhibit these disadvantages and which makes it possible, with a simple construction and with a reduced number of components, comprising only the body and the cover of the rigid envelope and the flexible separator, to achieve excellent conditions for anchoring of the separator and for the seal between the compartments defined in the envelope by the separator.

SUMMARY

According to the invention, the groove defined by the body and the cover is provided with an axial height which is greater than its radial width and, at rest, the flange has an approximately equal volume to that of the groove but has a greater height and a smaller width than the latter, so that, at the moment of assembly, the flange is compressed axially, that is to say in a direction perpendicular to the direction of the tensile stress exerted on the separator in the region of the flange, during operation.

By virtue of this arrangement, the deformation suffered by the flange in the groove at the moment of assembly tends to improve the conditions for retention of the flange in the groove, without the risk of flow towards the outside of the groove.

According to another characteristic of the invention, the body of the rigid envelope is provided with a widened cylindrical mouth which is intended to receive the cover so as to encase it, and which portion of the body is joined to the standard part of the body by a first inflected shoulder with firstly a part of concave curvature and then a part of convex curvature, the concave part of the said first shoulder forming a first axial end of the groove, whilst the convex part of the said first shoulder defines a first edge of the narrow passage, the cover having a cylindrical mouth which is designed to be encased in the said widened mouth of the body, and which is extended by a lip of smaller diameter, which lip is joined to the said mouth of the cover by a second inflected shoulder with firstly a part of convex curvature and then a part of concave curvature, the said convex part of the said second shoulder forming a second axial end of the groove, opposite the said first axial end, and the said lip constituting a second edge of the narrow passage, opposite the said first edge.

By virtue of this arrangement, the flange is trapped in the groove on either side of the narrow passage, that is to say both in the concave part of the first shoulder and in the space created between the lip of the cover and the widened mouth of the body, and also in the convex part of the second shoulder.

The assembly is thus constructed with a reduced number of components, comprising only the body and the lid, without it being necessary to provide an additional component for anchoring the flexible separator, whilst at the same time permitting excellent operating conditions.

According to another characteristic, the separator, in the rest condition, extends away from the flange in a direction which is approximately perpendicular to the axial height of the flange, then curves in a convex manner with a similar curvature to that of the convex part of the first shoulder, and subsequently has the concave shape of a bladder.

The thickness of the separator in the rest condition may vary. For example, in one construction it is lower at some distance from the flange than in the region of the latter, and it becomes greater in the region of the bottom of the bladder.

According to another characteristic of the invention, the two edges of the narrow passage are radially staggered so that, in the course of displacement of the separator during operation, the bending of the separator in the region of the flange takes place at different points, according to whether the separator is pulled towards one or other of the fluid orifices, and this avoids localisation of the fatigue on the separator and makes it possible to increase the lifetime of the latter.

Preferably, that edge of the narrow passage which is defined by the lip of the cover has a smaller diameter than the edge defined by the convex part of the shoulder of the body.

According to a further characteristic, the cover may comprise an abutment shoulder co-operating with the end of the mouth of the body, and this makes it possible to restrict the depth of insertion of the cover into the body and exactly to define the correct position of the cover and of the body in the assembled state, this enabling the axial compression of the flange to be determined with precision.

Moreover, in another embodiment of the invention, stiffening means, forming a brace, are arranged in the annular recess which is created on the outside of the rigid envelope at the location of the shoulder joining the widened cylindrical mouth to the body of the said rigid envelope, it being possible for the said shoulder to have any suitable shape, namely inflected, right-angled or the like.

By virtue of this arrangement, with plate metal of a thickness chosen to withstand a given pressure, it is possible, using the said stiffening means, to strengthen the construction in such a way that the pressure reservoir can be used at a higher pressure without any risk of elongation. It will therefore be appreciated that, by virtue of the invention, it is not necessary excessively to increase the thickness of the plate metal used for the reservoir, for the purpose of providing the shoulder with an adequate resistance to unrolling.

More particularly, by acting as a brace, the stiffening means positively prevent the shoulder from opening out, and this makes the construction extremely resistant to the effect of even a very high pressure in the reservoir, for a given thickness of plate metal.

In another embodiment of the invention, the stiffening means consist of a welding material which is deposited in the recess created by the shoulder, and which is formed either by a plurality of spaced-out beads of welding material or, preferably, by a continuous ribbon of welding material.

The stiffening means forming a brace, which preferably consist of a welding material either in the form of spaced-out beads or, preferably, in the form of a continuous ribbon, co-operate with the shoulder which joins the widened cylindrical mouth of the envelope to the body of the latter, regardless of the shape of this shoulder, which can be a shoulder with an inflection or a right-angled shoulder or also a shoulder of any suitable shape.

BRIEF DESCRIPTION OF THE DRAWINGS

FIG. 2 is a view on an enlarged scale of the groove and the flange in the assembled position;

FIG. 3 is an analogous view to FIG. 2, but shows the flange in the free rest position on the body of the envelope, before the cover is mounted, the cover being shown in chain-dotted lines;

DESCRIPTION OF THE PREFERRED EMBODIMENTS

Figure 1:
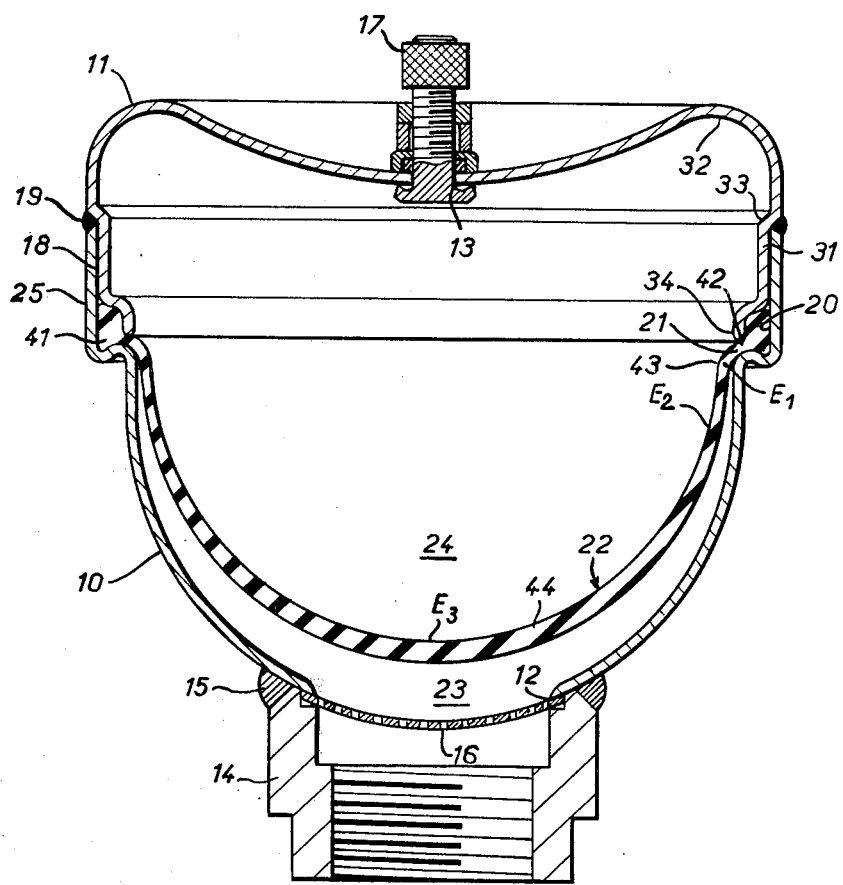
FIG. 1 is a general view, in diametral section, of a vessel according to the invention.

In the embodiment shown in FIGS. 1 to 3, a pressure vessel, such as an hydraulic accumulator, comprises (FIG. 1) a rigid envelope 10, 11 defining a chamber therein and made of a sufficiently strong material to withstand the pressures to which the vessel is subjected in service.

The rigid envelope 10, 11 is made of stamped plate steel and is provided with two axially aligned fluid orifices, namely a liquid orifice 12, for example for oil, and a gas orifice 13. The envelope 10, 11 comprises a body 10 and a cover 11.

The body 10 has a generally spherical or cylindrical/spherical shape and is provided with the oil orifice 12. Adjacent this oil orifice 12 to be in communication therewith, a connector 14 is fixed to the outside of the body 10, for example by means of a weld 15, whilst a filter, consisting of a perforated metal plate 16, covers the orifice 12.

The cover 11 is dish-shaped and is provided with the gas orifice 13, adjacent which a connector 17 is mounted on the outside of the cover, for blowing gas into the envelope in order to pre-charge the vessel.

The rim of the cover 11 is peripherally encased at 18 in the body 10 and is fixed to the latter, for example by means of a continuous annular ribbon of welding material 19. The body 10 and the cover 11 define therebetween an annular groove 20 which communicates with the interior of the envelope 10, 11 via a narrow annular passage 21.

A flexible separator in the form of a diaphragm 22, made of natural or synthetic rubber for example, or a material having analogous characteristics, divides the chamber in the envelope 10, 11 into two fluid compartments 23 and 24 of variable volume. The compartment 23 is an oil compartment communicating with the orifice 12, whilst the compartment 24 is a gas compartment communicating with the orifice 13. The diaphragm 22 has a rim portion, which passes through the narrow passage 21 and which has a flange 41 engaged in the groove 20.

The body 10 is provided with (FIG. 2), a widened cylindrical mouth 25 which is intended to receive the rim of the cover 11 so as to encase it. This widened cylindrical mouth 25 is integrally formed with the main part 26 of the body by means of a shoulder 27. The latter is inflected with a portion of concave curvature 28 and then a portion of convex curvature 29, relative to the interior of the mouth 25, these portions being separated by a point of inflection 30. The concave portion 28 forms a lower axial end of the groove 20. The convex portion 29 defines the lower edge of the narrow passage 21.

The cover 11 possesses at its rim a cylindrical mouth 31 (FIG. 1) which is separated from the main part 32 of the cover 11 by a shoulder 33. The latter is adapted to abut against the edge of the mouth 25 of the body 10 in order to define the position of the cover 11 on the body 10 when the pressure vessel is in the assembled state. In this assembled position, a wedge-shaped space is created between the shoulder 33 of the cover 11 and the edge of the mouth 25 of the body 10, for receiving the ribbon of welding material 19.

The cylindrical mouth 31 of the cover 11 (FIG. 2) is designed to be tightly encased in the mouth 25 of the body 10. The mouth 31 is extended by a cylindrical lip 34 of smaller diameter, which constitutes, at its edge 35, the upper edge of the narrow passage 21. The lip 34 is joined to the cylindrical mouth 31 of the cover 11 by a shoulder 36. The latter is inflected with a portion 37 of convex curvature and then a portion 38 of concave curvature, relative to the exterior of the cylindrical lip 34 and mouth 31.

The convex portion 37 and the concave portion 38 are separated by a point of inflection 39 which is approximately directly above the point of inflection 30 of the lower shoulder 27. The convex portion 37 forms an upper axial end of the groove 20. The convex portion 37 is thus opposite the lower axial end of the groove, formed by the concave portion 28, whilst the concave portion 38 of the shoulder 36 is opposite the convex portion 29 of the shoulder 27.

FIG. 2 shows the geometry of the groove 20 in detail. It is seen that the groove possesses a main region A which is located above the narrow passage 21 and defined between the mouth 25 and the lip 34. This upper region A of the groove 20, which region has the greatest height, extends near the top adjacent the convex portion 37 of the shoulder 36 so as to form a wedge-shaped space 40. Below the narrow passage 21, the groove 20 also possesses a substantial region B which is defined by the concave portion 28 of shoulder 27, but which is smaller than the region A located above the passage 21.

It is thus possible to distinguish, in the groove 20, three heights taken, for example, along the line joining the points of inflection 30 and 39; these heights are: the height of upper region A, which is the largest, the height of region B, which is the smallest, and the height of an intermediate region C, which is located opposite the narrow passage 21.

It should be noted that the height H of the groove 20, measured between the points of inflection 30 and 39 and corresponding to the sum of the values A, B and C, is greater than the width L of the groove 20, measured between the cylindrical mouth 25 and cylindrical lip 34.

Preferably, A is between 50 and 70% of H and preferably of the order of 60% of H, B is between 5 and 15% of H and preferably of the order of 10% of H, and C is between 10 and 20% of H and preferably of the order of 15% of H. By way of example, the height H is preferably between 1.2 and 2.2 times the value of the width L and preferably of the order of 1.5 L. This width L is equal to about twice C.

It should be noted that the angle of slope PA of the shoulder 36, at the location of the point of inflection 39, is between 10° and 40° and is preferably of the order of 25°, whilst the angle of slope PB of the shoulder 27, at the location of the point of inflection 30, is greater than the angle PA and is between 20° and 50° and preferably of the order of 35°.

As shown in FIG. 2, the bottom point P1 of the edge 35 is not located exactly opposite the top point P2 of the convex portion 29, but is deliberately staggered and, for example, is located nearer the chamber of the reservoir than P2, as shown. This offset D approximately corresponds to half the thickness E1 of the diaphragm 22 at the location of the point P1 and P2. It will be appreciated that, as measured in the plane of FIG. 2, the radius of curvature R1 of the surface at edge 35 is smaller than the radius of curvature R2 of the surface at portion 29 and, for example, is equal to about half the radius of the latter. By virtue of the points P1 and P2 being staggered, when the diaphragm 22 is allowed to deform during operation, either upwards or downwards, it is allowed to bend at different points, and this avoids localisation of the fatigue on the diaphragm 22. Thus, the diaphragm 22 has the advantage of a long lifetime.

The relaxed or rest state, i.e. before the cover 11 is located in the body 10, is illustrated in FIG. 3. The rim portion of the diaphragm 22 includes the flange 41 and has a part 42 which extends away from the flange 41 in a direction which is approximately perpendicular to the relaxed axial height H′ of the flange 41. The rim portion also includes a part 43 integral with part 42. The part 43 is curved in a convex manner with a similar curvature to that of the convex portion 29 of the shoulder 27. This part 43 is itself integrally formed with (FIG. 1) the main part 44 of the diaphragm 22 and has the upwardly concave shape of a bladder.

The parts 42 and 43 of the diaphragm 22, which are adjacent to the flange 41, have a thickness E1 which is similar to the height of the narrow passage 21, that is to say similar to the height C. This thickness E1 is equal to about half the relaxed width L′ of the flange 41. The part 44, of the diaphragm 22, located at some distance from the flange 41, has a thickness E2 (FIG. 1) which is less than the thickness E1, for example between 70 and 85%, and preferably of the order of 85% of the thickness E1. The thickness of the part 44 of the diaphragm 22 then increases up to a maximum value E3 in the region of the centre of the bladder. The value E3 is between 120 and 170%, and preferably of the order of 150% of the thickness E1.

When the flange 41 is in the relaxed state and engaged on the body 10, with the cover 11 (shown in chain-dotted lines in FIG. 3) not yet engaged in the body 10, the said flange has a relaxed height H′ which is greater than the height H of the groove 20, but has a relaxed width L′ which is smaller than the width L of the groove 20, H′ being measured at the same location as H, and L′ being measured at the same location as L. For example, H′ is of the order of 110% of H, whilst L′ is of the order of 85% of L. The upper edge 45 of the flange 41 is conical and has an angle PC which is greater than PA and equal to at least 110% of PA. It will be noted that the gap I₁ between the flange 41 and the lip 34 is greater than the gap I₂ between the flange 41 and the mouth 25, in order to allow for the fact that the height of the flange 41 is smaller to the left of the line 30–39 than to the right of this line.

When the cover 11 is mounted in the body 10, there is no danger of this cover 11 damaging the flange 41, because of the smaller relaxed width L′ of the flange.

During insertion of the cover 11 into the body 10 towards the definitive assembly position, defined by shoulder 33 abutting the edge of the mouth 25, the shoulder 36 pushes on the conical part 45 of the flange 41 and deforms this flange 41 by compressing it axially and by spreading it radially. The flange 41 then assumes the shape which is shown in FIG. 2, in which it approximately fills the whole volume of the groove 20, thus ensuring an excellent seal between the two compartments 23, 24.

The flange 41 has the advantage of excellent retention in the groove 20, not only because of the geometry which has now been described, but also due to the fact that its height is prestressed with a minimum lateral reaction, that is to say in a direction perpendicular to the direction of the forces which are exerted on the diaphragm 22 during operation and are transmitted to the flange 41.

To operate the vessel, gas is first admitted under pressure to the compartment 24 through the valve 17 until a precharge value is reached in the vessel. The diaphragm 22 will by then be applied against the inner wall of the body 10 and against the strainer 16. Liquid is then introduced through the connector 14 into the compartment 23 under a pressure which is greater than the precharge pressure, and this tends to deform the diaphragm 22 in the direction which corresponds to a reduction in the volume of the compartment 24. The vessel is then in the operating state.

It will be appreciated that, during operation, the diaphragm 22 is anchored to the rigid envelope 10, 11 under excellent conditions, by virtue of the flange 41 engaged in the groove 20 with the geometry which has been described above and with the prestressing conditions for the flange 41, which have also been described. At the same time, the flange 41 ensures an excellent seal between the compartments 23 and 24.

The extremely simple and robust construction of the envelope 10, 11 of which its components 10 and 11 are advantageously constructed from stamped plate steel, will also be appreciated.

As a variant (FIGS. 4 and 5), a pressure vessel, such as a hydraulic accumulator, comprises (FIG. 4) a rigid envelope 110, 111, with an analogous arrangement to that described with reference to FIGS. 1 to 3.

The rigid envelope 110, 111 is composed of a body 110 and a cover 111, which respectively have a liquid orifice 112 and a gas orifice 113, axially aligned with one another.

Figure 4:
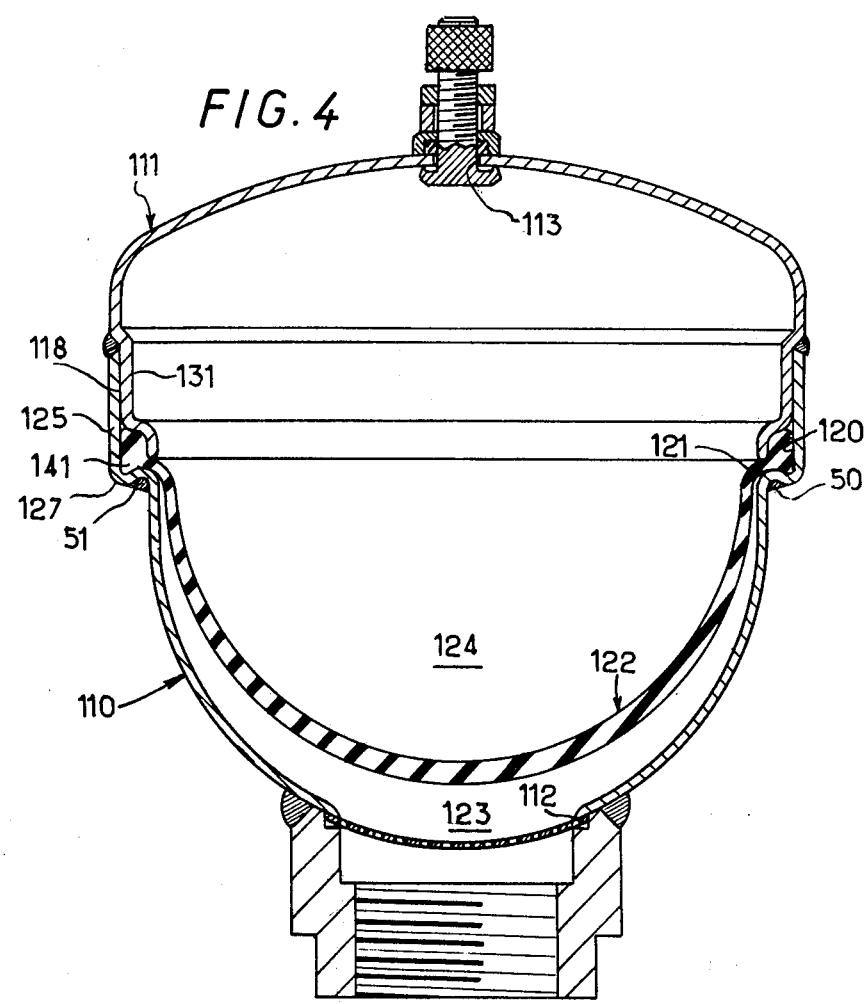
FIG. 4 shows an alternative embodiment in an analogous view to FIG. 1.

It will be appreciated that, in the example shown in FIG. 4, the cover 111 is convex instead of being concave as in the example shown in FIGS. 1 to 3.

The body 110 and the cover 111 defines an annular groove 120 which communicates with the interior of the envelope via a narrow passage 121. A flexible diaphragm 122 divides the chamber in the envelope into two compartments 123 and 124 of variable volume, which are respectively associated with the orifice 112 and the orifice 113.

The separator 122 passes through the narrow passage 121 and has a flange 141 engaged in the groove 120.

The body 110 of the rigid envelope is provided with a widened cylindrical mouth 125 which is intended to receive the cover 111 so as to encase it at 118.

The widened cylindrical mouth 125 (FIG. 5) is joined to the main part of the body 110 by a first shoulder 127 which is inflected with a portion 128 of concave curvature and a portion 129 of convex curvature. The concave portion 128 of the shoulder 127 forms a first axial end of the groove 120. The convex part 129 of the shoulder 127 defines a first edge of the narrow passage 121.

The cover 111 has a cylindrical mouth 131 which is designed to be encased at 118 in the widened mouth 125 of the body 110, and which is extended by a lip 134 of smaller diameter. The lip 134 is joined to the mouth 131 of the cover by a second shoulder 136 which is inflected with a portion 137 of convex curvature and a portion 138 of concave curvature. The convex portion 137 forms a second axial end of the groove 120, opposite the end 128. The lip 134 constitutes a second edge of the narrow passage, opposite the edge formed by the convex portion 129 of the first shoulder 127.

This first shoulder 127 creates an annular recess 50 on the outside of the rigid envelope 110, 111. This annular recess 50 is defined by the outside surface of the convex portion 129 of the shoulder 127.

Stiffening means 51 are provided in order to make the construction particularly resistant to the effects of even a very high pressure in the pressure vessel, taking account of the thickness of the plate metal, and, in particular, in order to prevent the shoulder 127 from opening out.

These stiffening means 51 are arranged in the recess 50 where they act as a brace to join a region 52 of the body 110, located on the outside of the concave portion 128 of the shoulder 127, to a region 53 of the body 110, located on the outside, slightly below the convex portion 129 of the shoulder 127.

The stiffening means 51 preferably consist of a ribbon of welding material, which is deposited in the annular recess 50.

It will be appreciated that this deposition of a ribbon of welding material can be carried out efficiently under very economic conditions.

It will also be appreciated that, instead of forming a continuous annular ribbon, the welding material can be formed by a succession of spaced-out beads of welding material. Moreover, the stiffening means forming a brace can have any other suitable shape and can consist, for example, of a circular series of gussets.

Figure 5:
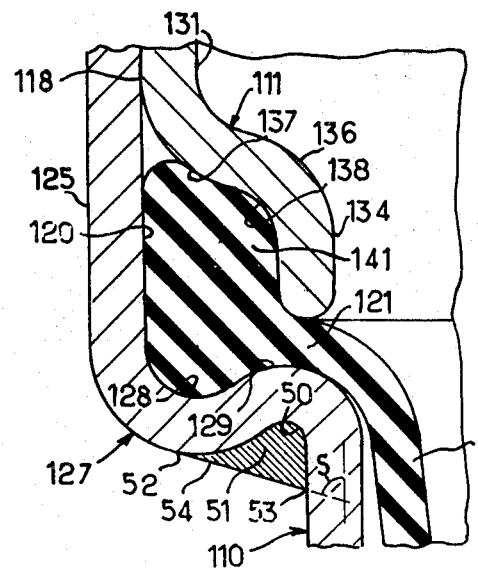
FIG. 5 is a view of a detail of FIG. 4, on a larger scale, and shows a ribbon of welding material arranged in the external recess in the shoulder of the envelope of the reservoir, this shoulder having an inflected shape.

FIG. 5 shows the ribbon of welding material 51 with an external surface 54 which is inclined, relative to the axis of the vessel, in such a way that the point 53 is located at a lower level than that of the point 52, so as to ensure particularly effective stiffening of the construction.

However, the greater the inclination of the external surface 54 of the ribbon of welding material and the lower the point 53 and the greater the actual volume of the ribbon 51, which factors improve the stiffening performances, the greater is the actual consumption of welding material, and this limits the choice of a large inclination.

In practice, it has been found that an inclination of the external surface 54 of the ribbon 51, relative to the axis of the vessel, with an angle S of between 60° and 80° gives good results from the point of view of both strength and economy.

Moreover, for the purpose of economy, it can be envisaged to give the external surface of the ribbon of welding material an orientation which is approximately perpendicular to the axis of the reservoir. In this case, the angle S is of the order of 90°, which corresponds to a reduced consumption of welding material whilst at the same time permitting a substantial increase in the resistance of the reservoir to elongation under the effect of a high pressure, for a given grade of plate metal (given thickness and the like).

Figure 6:
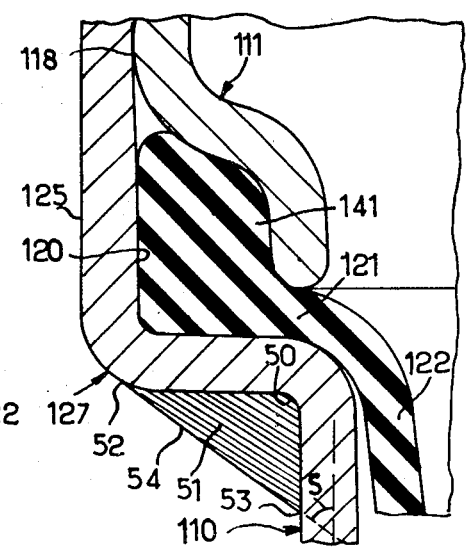
FIG. 6 shows a further alternative embodiment, in an analogous view of FIG. 5, the shoulder being right-angled.

Reference will now be made to FIG. 6, in which the arrangement is analogous to that described with reference to FIGS. 4 and 5, but the shoulder 127 is right-angled instead of being inflected.

The stiffening ribbon of welding material 51 is still arranged in the recess 50 created on the outside of the envelope 110, 111 by this shoulder. The angle S formed by the external surface 54 of the stiffening ribbon 51 with the axis of the reservoir can have any suitable value and can be, for example, between 30° and 50°.

Of course, the stiffening material arranged in the recess created by the shoulder can be formed not only by a welding material but also by any material having analogous properties, in particular a material which can be hardened.

I claim:

1. A pressure vessel which comprises a rigid envelope, a chamber defined by the envelope, which envelope comprises a body and a cover, a fluid orifice provided in the body and the cover, said two orifices being axially aligned, the cover being peripherally encased in the body so that they partially overlap and the cover being fixed to the body, an annular groove defined between the said body and the said cover in the region where they overlap, said groove including an upwardly directed first shoulder on said body and a second downwardly directed shoulder on said cover, a narrow passage via which passage the groove communicates with the chamber, a flexible separator dividing the chamber into two fluid compartments of variable volume, which are each associated with one of the two said orifices, said separator having portions passing through the said narrow passage, a flange provided on the separator and engaged in the said groove, the groove having an axial height between said shoulders which is greater than its radial width; and the flange, in the unstressed condition thereof, having an approximately equal volume to that of the groove but having a greater height and a smaller width than the groove, said flange, in the assembled condition of said pressure vessel, being axially compressed between said shoulders thereby to reduce the heightwise dimension of said flange and expand said flange radially into contact with said groove.

2. A pressure vessel according to claim 1, wherein a widened cylindrical mouth and a main part form the body of the rigid envelope, said mouth being adapted to receive the periphery of the cover so as to encase it, said first shoulder being inflected and joining the mouth to the main part of the body, and including a portion of concave curvature and a portion of convex curvature, said first axial end of said groove being defined by said concave portion of the said first shoulder, a first edge of the narrow passage being defined by the convex portion of the said first shoulder, a cylindrical mouth provided on the cover, which mouth is designed to be encased in the said widened mouth of the body, a lip extending from the mouth on the cover, said lip being of smaller diameter than said mouth, said second shoulder being inflected and joining said lip to the said mouth of the cover, said second shoulder being formed by a portion of convex curvature and a portion of concave curvature, the upper axial end of said groove being defined by the convex portion of the said second shoulder at a position opposite the said first axial end, and a second edge of the narrow passage, opposite the said first edge, being defined by the said lip.

3. A pressure vessel according to claim 2, characterised in that the two edges of the narrow passage are radially staggered.

4. A pressure vessel according to claim 3, wherein the second edge of the narrow passage, defined by the lip of the cover, has a smaller radius of curvature than that of the first edge of the narrow passage defined by the convex portion of the first inflected shoulder.

5. A pressure vessel according to claim 2, wherein the cover has a third shoulder cooperating as an abutment with the edge of the mouth of the body positively to locate said parts.

6. A pressure vessel according to claim 2, wherein the first shoulder, on the body, and the second shoulder, on the cover, have points of inflection which are located approximately in direct vertical alignment with one another.

7. A pressure vessel according to claim 6, wherein, when the flange is engaged on the body and before the cover is mounted on the body, the radial gap created between the flange and the future location of the lip of the cover is greater than the radial gap created between the said flange and the mouth of the body.

8. A pressure vessel according to claim 2, wherein the height H of the groove, measured at the location of the points of inflection of the first and the second shoulders, is between 1.2 and 2.2, and preferably of the order of 1.5, times the width L of the groove, measured between the lip of the cover and the mouth of the body.

9. A pressure reservoir according to claim 8, characterised in that a part A of the height H of the groove, located above the narrow passage, is between 50 and 70%, and preferably of the order of 60%, of H, a part B of the height H of the groove, located below the narrow passage, is between 5 and 15%, preferably of the order of 10%, of H, and a part C of the height H of the groove, located opposite the narrow passage, is between 10 and 20%, and preferably of the order of 15%, of H.

10. A pressure vessel according to claim 6 wherein the angle of slope PB of the first shoulder, at the location of its point of inflection measured downwardly from the longitudinal axis of the body, is between 20° and 50° and preferably of the order of 35°.

11. A pressure vessel according to claim 6 wherein the angle of slope PA of the second shoulder, at a location of its point of inflection, is between 10° and 40°, measured upwardly from the longitudinal axis of the body, and preferably of the order of 25°.

12. A pressure vessel according to claim 11, wherein, when the flange is engaged on the body and before the cover is mounted, the upper part of the flange is conical with an angle of slope PC which is equal to at least 110% of the angle of slope PA of the second shoulder, at the location of its point of inflection.

13. A pressure vessel according to claim 1 wherein the separator in the unstressed condition thereof, extends away from the flange in a radial direction, then curves in a convex manner and subsequently has the concave shape of a bladder.

14. A pressure vessel according to claim 13, wherein the thickness of the separator, in the region of the flange, is equal to about half the width of the flange.

15. A pressure vessel according to claim 13, wherein the thickness of the separator is smaller at a location spaced from the flange than in the region of the latter, and then becomes greater in the region in the centre of the bladder.

16. A pressure vessel according to claim 1 in which a widened cylindrical mouth and a main part form the body of the rigid envelope, said mouth being adapted to receive the periphery of said cover so as to encase it, an external shoulder joining the mouth to the main part of the body, a recess on the outside of the rigid envelope at the junction of said external shoulder and said body, and stiffening means, forming a brace, being arranged in said recess.

17. A pressure vessel according to claim 16 wherein the said stiffening means comprise a material which is deposited in the said recess and extends at least partially about said periphery and is firmly bonded to the rigid envelope.

18. A pressure vessel according to claim 17, wherein the said material forms a continuous annular ribbon.

19. A pressure vessel according to claim 17, wherein the said material is a welding material.

20. A pressure vessel according to claim 16, wherein said external shoulder is inflected, and defined by a portion of concave curvature and a portion of convex curvature form the shoulder.

21. A pressure vessel according to claim 16, wherein the said external shoulder is right-angled.

* * * * *